(12) United States Patent
Vogel et al.

(10) Patent No.: US 8,966,752 B2
(45) Date of Patent: *Mar. 3, 2015

(54) SHAFT SUCH AS A CAMSHAFT FOR INTERNAL COMBUSTION ENGINES

(71) Applicant: Neumayer Tekfor Holding GmbH, Hausach (DE)

(72) Inventors: Manfred Vogel, Kappelrodeck (DE); Matthias Derse, Elzach (DE); Matthias Bechtold, Haslach-Bollenbach (DE); Thomas Winkler, Sulzbach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,469

(22) Filed: Jan. 22, 2013

(65) Prior Publication Data

US 2013/0133195 A1 May 30, 2013

Related U.S. Application Data

(60) Division of application No. 11/997,953, filed on Feb. 5, 2008, now Pat. No. 8,381,615, which is a continuation of application No. PCT/DE2006/001379, filed on Aug. 7, 2006.

(30) Foreign Application Priority Data

Aug. 5, 2005 (DE) .......................... 10 2005 036 994

(51) Int. Cl.
*B21K 1/12* (2006.01)
*B23P 15/00* (2006.01)
(Continued)

(52) U.S. Cl.
CPC .............. *B23P 15/00* (2013.01); *B21D 53/845* (2013.01); *F01L 1/047* (2013.01); *F16C 3/023* (2013.01);
(Continued)

(58) Field of Classification Search
USPC ............ 29/523, 6.01, 522.1, 888.1, 559, 252, 29/283.5, 421.1; 123/90.6; 72/58, 370.06; 403/277
See application file for complete search history.

(56) References Cited

U.S. PATENT DOCUMENTS 3,106,195 A 10/1963 Hanley
3,999,277 A 12/1976 Hamada
(Continued)

FOREIGN PATENT DOCUMENTS

DE 38 03 683 A1 8/1989
DE 41 17 876 C1 5/1991
(Continued)

OTHER PUBLICATIONS

International Search Report dated Jan. 29, 2007 with English translation of relevant portion (ten (10) pages).
(Continued)

*Primary Examiner* — David Bryant
*Assistant Examiner* — Jun Yoo
(74) *Attorney, Agent, or Firm* — Crowell & Moring LLP

(57) ABSTRACT

A shaft, such as a camshaft for use in the internal combustion engine of a motor vehicle, in which the shaft includes a basic shaft body, a plurality of functional bodies, such as cams, mounted in axially spaced positions on the basic shaft body, and at least one balancing element mounted on the basic shaft body, in which the at least one balancing element is produced separately from the basic shaft body and from the functional bodies, and the functional bodies and the at least one balancing element are subsequently mounted on said basic shaft body, for example, by axial press fitting.

2 Claims, 1 Drawing Sheet

(51) Int. Cl.
*B21D 53/84* (2006.01)
*F01L 1/047* (2006.01)
*F16C 3/02* (2006.01)
*F16D 1/068* (2006.01)
*F16D 1/08* (2006.01)
*F16F 15/26* (2006.01)
*F16F 15/34* (2006.01)

(52) U.S. Cl.
CPC .............. *F16D 1/068* (2013.01); *F16D 1/0858* (2013.01); *F16F 15/26* (2013.01); *F16F 15/264* (2013.01); *F16F 15/34* (2013.01); *F01L 2103/00* (2013.01); *F01L 2800/15* (2013.01); *F16F 2226/04* (2013.01)
USPC ............... 29/888.1; 29/523; 29/6.01; 74/567; 123/90.6; 403/277; 72/58

(56) References Cited

U.S. PATENT DOCUMENTS

| | | | |
|---|---|---|---|
| 4,993,282 A | | 2/1991 | Swars |
| 5,299,881 A | * | 4/1994 | Mettler-Friedli ............. 403/274 |
| 5,348,210 A | | 9/1994 | Linzell |
| 5,951,261 A | | 9/1999 | Paczuski |
| 6,286,196 B1 | | 9/2001 | Vogel |
| 6,314,643 B1 | | 11/2001 | Leith |
| 6,619,926 B2 | | 9/2003 | Manole et al. |
| 6,804,884 B1 | | 10/2004 | Vogel |
| 7,325,305 B2 | | 2/2008 | Vogel |
| 7,484,296 B2 | * | 2/2009 | Merz ........................... 29/888.1 |
| 7,992,533 B2 | * | 8/2011 | Vogel et al. .................. 123/90.6 |
| 2004/0134063 A1 | | 7/2004 | Vogel |
| 2004/0187637 A1 | | 9/2004 | Gokan |
| 2004/0237706 A1 | | 12/2004 | Merz |
| 2008/0127916 A1 | | 6/2008 | Burgess et al. |

FOREIGN PATENT DOCUMENTS

| | | |
|---|---|---|
| DE | 40 30 568 A1 | 4/1992 |
| DE | 43 36 809 A1 | 5/1995 |
| DE | 198 31 333 A1 | 1/2000 |
| DE | 199 38 791 A1 | 3/2001 |
| DE | 101 01 539 A1 | 8/2002 |
| DE | 10 2004 010 833 A1 | 9/2004 |
| EP | 0 478 915 B1 | 4/1992 |
| GB | 124883 | 4/1919 |
| JP | 2001-82165 A | 3/2001 |
| WO | WO 97/27409 A1 | 7/1997 |

OTHER PUBLICATIONS

JP 2001-082165 Machine Translation.
English Abstract of DE 41 17 876 C1.

* cited by examiner

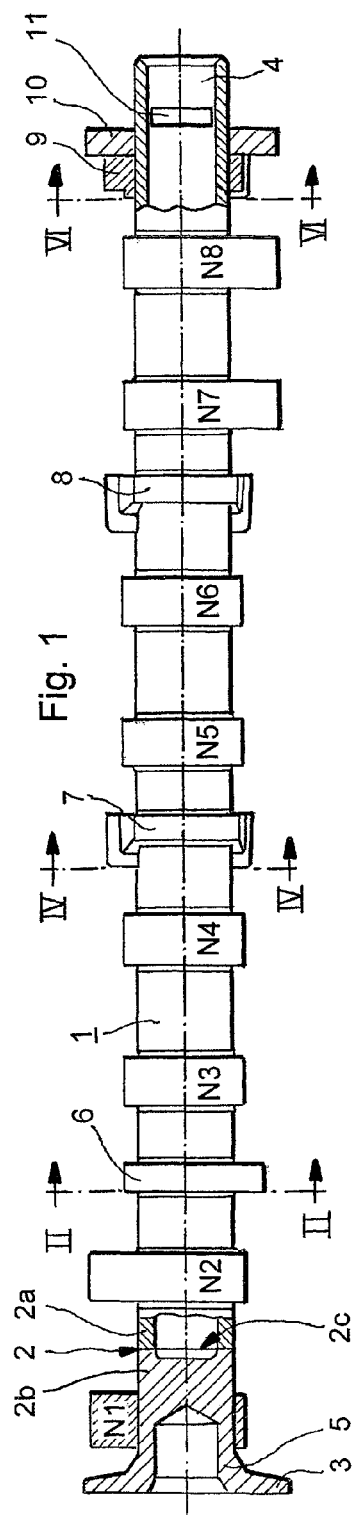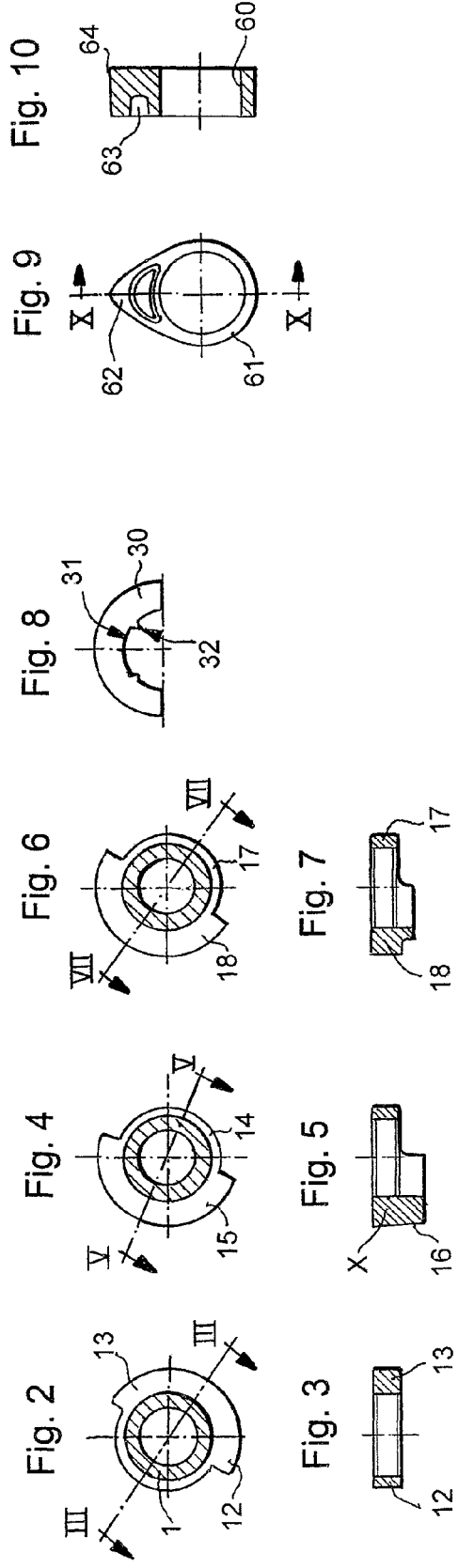

SHAFT SUCH AS A CAMSHAFT FOR INTERNAL COMBUSTION ENGINES

CROSS REFERENCE TO RELATED APPLICATIONS

This application is a divisional of U.S. application Ser. No. 11/997,953, filed Feb. 5, 2008, which is a continuation of international application no. PCT/DE2006/001379, filed Aug. 7, 2006 designating the United States of America, and published in German on Feb. 15, 2007 as WO 2007/016914, the entire disclosure of which is incorporated herein by reference. Priority is claimed based on Federal Republic of Germany patent application no. DE 10 2005 036 994.4, filed Aug. 5, 2005.

BACKGROUND OF THE INVENTION

Camshafts are used to control the gas exchange valves in internal combustion engines. In a four-cycle engine, the camshafts rotate at half the engine speed. The control elements used to move the gas exchange valves are cams consisting of base circle areas and radially elevated or lobed areas. An end piece to receive the chain wheel or gear wheel or a sensor wheel and other elements may be additionally provided, for example, on the camshaft.

In accordance with their function the cams on the camshaft are mounted offset in the longitudinal axis. As a result, the camshaft as a whole is imbalanced, which can lead to additional undesirable engine vibrations at least in certain speed ranges.

Furthermore, all the rotating masses of the engine cause vibrations. At least some of these vibration phenomena can be compensated in practice by installing counter-imbalances. These counter-imbalances can be balancing weights on the camshaft, and/or so-called balancer shafts can be provided specifically for this purpose.

Published German patent application nos. DE 40 30 568 C2 and DE 43 36 809 C2 describe the use of balancing weights in camshafts. In one embodiment of DE 40 30 568 C2, balancing masses are eccentrically offset relative to the axis of rotation to compensate imbalances in a solid camshaft. In another embodiment, balancing masses in the form of tubular sections are likewise eccentrically offset relative to the axis of rotation. Such shafts are expensive to manufacture and have limited application.

DE 43 36 809 C2 proposes that cams mounted to the shaft be provided with a bore and mounted to a basic shaft body. On the side of the cam opposite the cam lobe the cams have a balancing mass in the form of a projection configured as an axial extension, namely a half shell integrally formed with the cam. Such camshafts again have limited application because the position of the cams and the balancing weight must be defined in advance in relation to each other and cannot be varied.

SUMMARY OF THE INVENTION

It is an object of this invention to provide particularly camshafts and methods for their production, where production is simpler and more cost-effective and the balance/imbalance distribution can be carried out more precisely than before.

Another object is to expand the possible applications and uses of camshafts and also to take into account the mass distribution of other components that are mounted, or to be mounted, to the shaft.

These and other objects are achieved with a shaft, such as particularly in the camshaft having functional bodies provided on the shaft body, such as cams, in that the balancing masses are elements produced separately from both the functional elements, such as cams, and the shaft, and are mounted to the shaft, such as the camshaft, for example. These elements can be fixed either to the cam itself or to the basic shaft body.

A particularly advantageous manner of mounting these elements is axial press fitting, so that these elements are axially and rotationally fixed on the shaft. It can be particularly advantageous if both the cam and the compensation or balancing elements or weights are fixed by axial press fitting. For example, the cam and compensating elements can be affixed to the basic shaft body by sliding the elements into desired positions on a tubular shaft and then expanding the tubular shaft by a high hydraulic pressure in the interior of the tubular shaft to achieve a rotationally secure connection between the cam and compensating elements and the shaft as described in published German patent application no. DE 40 30 568. Alternatively the cam and compensating elements can be affixed to the basic shaft body by sliding the elements into desired positions on a smooth tubular shaft and then shrink fitting the elements onto seats formed on the shaft to form a secure connection as described in published German patent application no. DE 43 36 809. Another possibility is to slide the cam and compensating elements onto a tubular shaft with a reinforcing sleeve of greater diameter disposed between successive elements, the sleeve having collar regions of reduced diameter extending underneath the cam and compensating elements and then hydraulically expanding the tubular shaft and the sleeves to clamp the sleeves between the tubular shaft and the cam elements in a force locking way as described in U.S. Pat. No. 4,993,282 (=DE 38 03 683). See also U.S. Pat. No. 6,286,196 (=DE 198 31 333); U.S. Pat. No. 6,804,884 (=DE 199 38 791), and US patent publication no. 2004/134063 (=DE 101 01 539). The entire disclosures of all these documents are hereby incorporated herein by reference.

Balancing weights or elements that are mounted to a basic shaft body by axial press fitting are preferably annular and have a balancing region with a larger mass and a support region with a smaller mass. Compared to the balancing region having the larger mass, the support region can have a smaller axial extent than the balancing region. The support region can also be asymmetrical to the balancing region in a plane perpendicular to the axis of rotation.

The balancing elements can also be configured at least approximately like a half shell and mounted to the shaft body. They can be secured by laser beam welding, as well as by soldering or bonding. It is particularly advantageous to secure them using capacitor discharge welding, because capacitor discharge welding causes no warping and practically no heating of the area surrounding the weld. If welding is used to secure the elements, it may be advantageous if the balancing elements have at least one inwardly directed contour. This contour can even take the form of a bead extending at least axially parallel, which in the welding process produces the joint with the camshaft or the basic camshaft body.

Balancing elements or balancing weights with different masses can be mounted to one and the same camshaft.

The functional separation of cam control and mass compensation using separately produced balancing elements or balancing masses also makes possible a modular construction of the camshaft. The same basic camshaft body can be used with different cams and corresponding balancing masses depending on the requirements and the application. It also offers significant tool cost savings.

The invention also makes it possible in a particularly simple and advantageous manner to take into account the mass of the other elements mounted, or to be mounted, to the shaft, such as a sensor, a drive wheel or the like, by means of the number and position of the centers of gravity of the balancing elements.

It is further possible in a particularly advantageous manner to dispose the balancing weights or elements on the shaft in such a way that the shaft itself has an imbalance, which however compensates or equalizes vibrations produced by other rotating masses.

A further inventive concept relates to the production of so-called jointed shafts with non-round functional bodies, i.e., camshafts, for example, in which cams are mounted to a basic shaft body using axial press fitting. It has been found that in this type of camshafts, in which the cams are first ground to the specified contour and then press fit, the external form of the cams differs from the specified contour, so that engine control is negatively affected. Not only the cylindrical mounting region is deformed but there are also deformations in the radially elevated or lobed region of the cam. Therefore, the object of the further inventive concept was to prevent such deformations and, in particular, to create camshafts in which the outer contour of the functional bodies, i.e., the cam, for example, also corresponds to the specified contour in the mounted state. This is achieved by clamping the cam by its inner bore using a clamping element, such as a hydraulic or mechanical mandrel, as the outer contour is ground. This produces an expansion of the cam, which corresponds to the expansion after mounting of the cam to the camshaft. This makes it possible to produce the outer contour exactly in accordance with the specified contour.

Another inventive concept relates to the configuration of functional bodies, particularly cams for a jointed camshaft. The object of this part of the invention was to save material, make camshafts cheaper and reduce the imbalance in camshafts. According to the invention this is achieved by forming a recess in the cam that axially penetrates the cam in the cam lobe at least in part. This recess can be axially continuous or can optionally penetrate the cam only in part. The recess—as viewed in the direction of the front side of the cam—can be sickle shaped and can be formed from only one side or from both sides. The recess, however, can also be a continuous, at least approximately circular opening.

It is clear that this saves a substantial amount of expensive material, which would otherwise be needed in solid cams.

BRIEF DESCRIPTION OF THE DRAWINGS

The invention will be described in further detail hereinafter with reference to illustrative preferred embodiments shown in the accompanying drawing figures, in which:

FIG. 1 is a side elevation of an illustrative camshaft constructed in accordance with the present invention.

FIG. 2 is sectional view taken along line II-II of FIG. 1 showing the configuration of a first balancing weight;

FIG. 3 is a section al view taken along line of FIG. 2;

FIG. 4 is a sectional view taken along line IV-IV of FIG. 1 showing the configuration of a second balancing element;

FIG. 5 is a sectional view taken along line V-V of FIG. 4;

FIG. 6 is a section al view taken along line VI-VI of FIG. 1 showing the configuration of a third balancing element;

FIG. 7 is a sectional view taken along line VII-VII of FIG. 6;

FIG. 8 is a view of a weldable balancing weight;

FIG. 9 is a sectional view of another balancing weight embodiment; and

FIG. 10 is a sectional view taken along line X-X of FIG. 9.

DETAILED DESCRIPTION OF PREFERRED EMBODIMENTS

FIG. 1 shows a so-called jointed camshaft 1 with a basic shaft body 2, comprised of a tubular section 2a and a partially hollow end piece 2b fixed thereto, for example, by welding, friction welding or the like. The end piece 2b can be produced by solid forming and is connected at 2c to pipe 2a using the methods described above. The extension 2b has a flange 3 on its side opposite the joint. After the pipe section 2a and end piece 2b have been joined, the surface of the shaft-like basic body is finish-machined from the end region 4 to the start of the collar 5 and prepared for axial press fitting of cams N1 to N8 and the balancing weights. These are then axially press fit in the appropriate sequence in a manner described in the above-cited German laid-open applications. The sensor wheel 10 can be similarly mounted. At its end 4 the hollow shaft 2a is terminated by a sealing cap 11 to prevent oil from penetrating it and producing an imbalance.

The balancing weight 6 is shown in FIG. 2 in a view in the direction of arrows II-II of FIG. 1 and also in FIG. 3 in a section taken along line of FIG. 2. It has a support portion 12 formed as a partial cylinder and an region 13 having a greater radial extent and therefore a larger mass.

The balancing element 7 shown in FIG. 4 in a view in the direction of arrows IV-IV is asymmetrical in the plane perpendicular to the axis of rotation—as illustrated in a section in FIG. 5 taken along line V-V of FIG. 4. This balancing weight or balancing mass 7 also has a support region 14 configured as a partial cylinder and an region 15 having a larger mass. To shift the mass center of gravity X axially closer toward the support region 14, region 15 having the larger mass is conical, i.e., its mass decreases in axial direction away from the annular support region. The conical configuration is identified by reference numeral 16.

FIG. 6 shows the balancing element 9 in a view in the direction of arrows VI-VI. FIG. 7 shows the balancing element 9 in a section taken along line VII-VII of FIG. 6, again with a partially cylindrical support region 17 and an region 18 with a greater mass. Here—as in FIG. 5—the radial and axial extent of region 18 is again substantially greater than that of region 17.

Instead of mounting at least single balancing elements 6 to 9, it is also possible to mount the balancing weights shown in FIG. 8 to the basic shaft body. The balancing elements 30 are at least approximately half-shell-shaped and have a contour 31 in their radially inner area that is adapted at least approximately to the basic shaft body. Two weld beads 32 protrude radially inwardly from this contour, so that the balancing elements 30 can be welded to the basic shaft body, using, for example, capacitor discharge welding, resistance welding or the like, such that the two weld beads 32 melt onto the basic shaft body.

FIG. 9 shows a side view of the cam N2 of FIG. 1, and FIG. 10 shows a section taken along line X-X of FIG. 9. The cam 3 has a bore 60 and a partially cylindrical region 61 that merges into a radially elevated or lobed region 62. A recess 63 is formed in the lobed cam region 62 to save material and weight. The recess 63 can also be axially continuous.

Such cams are produced by corresponding operations, i.e., forging, optionally abrasive blasting, turning of the bore 60, hard turning of the bore to the fitting dimensions, grinding the peripheral contour and optionally final barrel polishing to the finishing dimensions. However, when the cams are axially press-fitted via their bore 60, the outer form of the cams changes relative to the specified contour, i.e., not only in the cylindrical region 61 but also in the lobed region 62. To ensure that the cam's shape corresponds exactly to the specified contour even in the press-fitted cam, the cam 3 is held by a clamping device via its circular inner bore 60 when the outer contour 64 is ground so as to expand the cam in the same manner as in the axial press fitting operation. To this end, the cam can be held on a mechanical or hydraulic clamping element to produce the same kind of overlap as in the cam that is press-fitted onto the shaft. This makes it possible to finish the outer contour exactly to the specified contour. After the tension is released, the shape of the element is not as specified, but once the cam is mounted it meets the specification again.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method for producing a non-circular functional body for press fitting onto a shaft, said method comprising:
  deforming the functional body into a state corresponding to deformations which arise when the functional body is press fit onto the shaft;
  grinding the functional body to a specified configuration while the functional body is in the deformed state;
  releasing the ground functional body from the deformed state, whereby the functional body departs from the specified configuration; and
  press fitting the functional body onto the shaft, whereby the functional body reassumes said specified configuration.

2. A method as claimed in claim 1, wherein said functional body is a cam and said shaft is a camshaft.

* * * * *